United States Patent [19]

Rose

[11] 4,199,092

[45] Apr. 22, 1980

[54] FLEXURE MOUNT FOR CAPSTAN MOTOR

[75] Inventor: Stanley E. Rose, Phoenix, Ariz.

[73] Assignee: Omnicomp, Inc., Phoenix, Ariz.

[21] Appl. No.: 951,575

[22] Filed: Oct. 16, 1978

[51] Int. Cl.² ............................................ B65H 17/22
[52] U.S. Cl. ...................................... 226/181; 242/206
[58] Field of Search ......................... 226/181, 190, 194; 242/192, 197–206; 244/54; 248/58 R, 15, 18, 20, 21

[56] References Cited

U.S. PATENT DOCUMENTS

| | | | |
|---|---|---|---|
| 3,432,082 | 3/1969 | Beville et al. | 226/194 X |
| 3,949,919 | 4/1976 | Takei | 226/194 |
| 4,008,841 | 2/1977 | Dattilo | 226/194 |
| 4,085,906 | 4/1978 | Dahl et al. | 242/192 |

*Primary Examiner*—Leonard D. Christian
*Attorney, Agent, or Firm*—Cahill, Sutton & Thomas

[57] ABSTRACT

A system for mounting a motor driving a motor capstan includes a single flexible metal sheet which includes four bends along four spaced parallel flexure lines. The four flexure lines divide the sheet into five sections, including first and second end sections, first and second leg sections adjacent to the first and second end sections, respectively, and a motor support section disposed between the first and second leg sections. The first and second end sections are attached to a rigid support surface. The first and second leg sections have flanges to provide structural strength. The first and second leg sections are oriented at downward angles from the rigidly mounted surface. The motor support section is approximately parallel to the rigid mounting surface and includes an opening therein for accommodating the motor. The motor is attached to the motor support sheet by means of upper and lower clamping plates having opposed beveled surfaces and wedging means forced against the motor housing by the opposed beveled surfaces as the clamping plates are clamped together. The planes of the first and second leg sections extend below the motor support plate to intersect in a line which passes through a composite center of gravity of the motor, motor capstan, stainless steel sheet, and clamping plates. The first and second end sections are attached to the rigid support surface to prestress the flexible sheet along the four flexure lines so that the flexure sheet produces a predetermined resistance to angular displacement of the motor and motor capstan.

10 Claims, 4 Drawing Figures

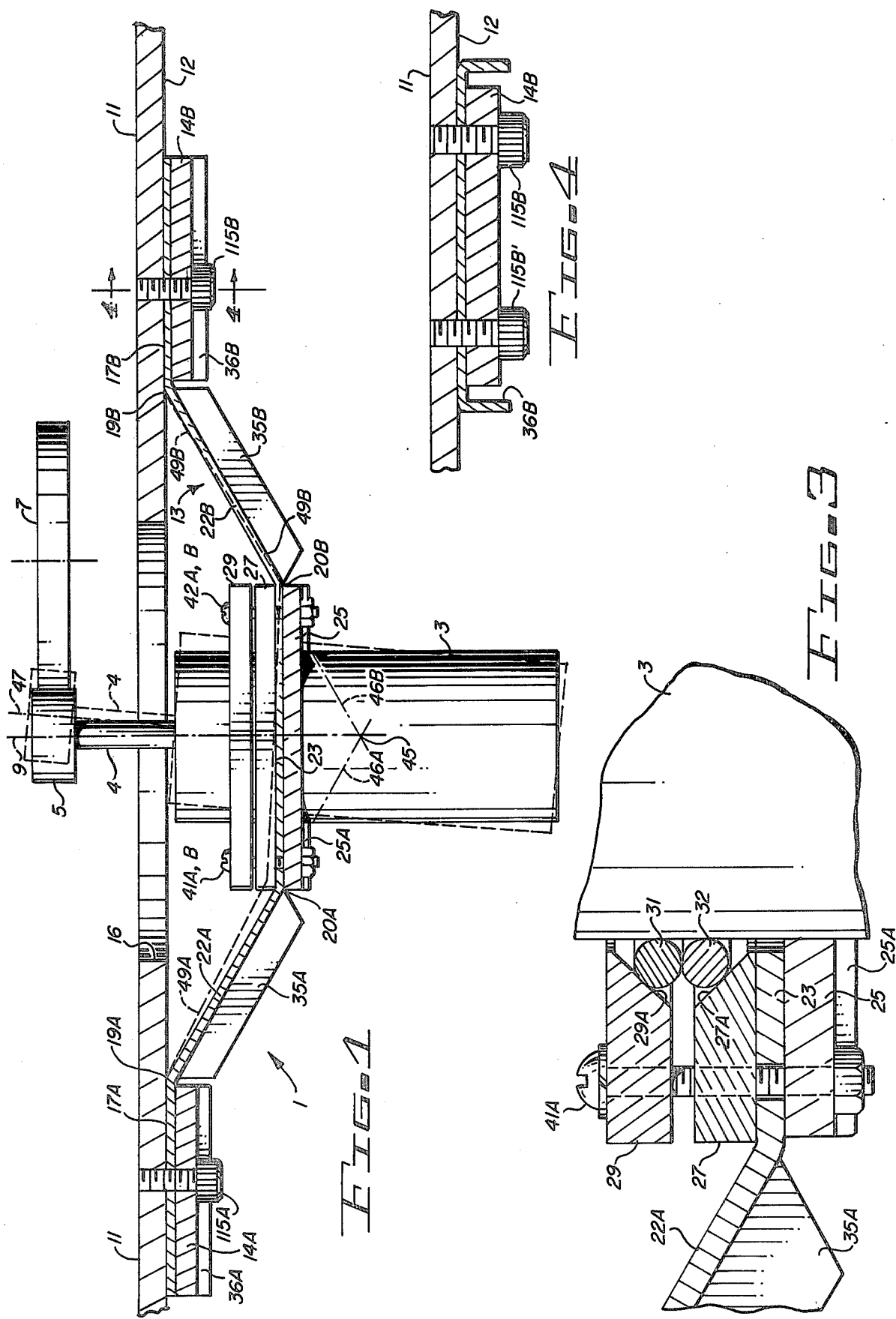

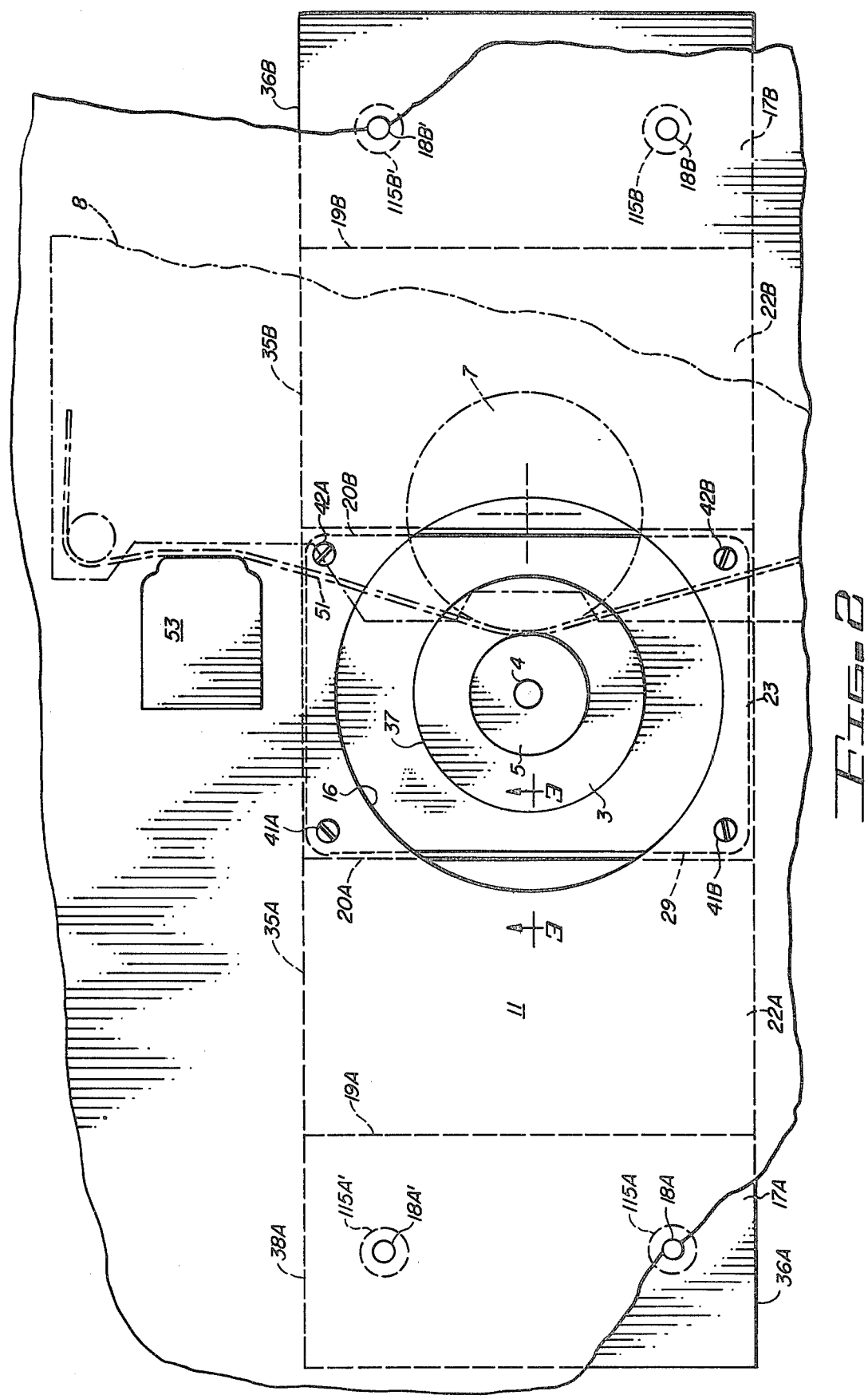

FLEXURE MOUNT FOR CAPSTAN MOTOR

BACKGROUND OF THE INVENTION

1. Field of the Invention

The invention relates to apparatus for mounting an electric motor to permit the electric motor to be angularly displaced about a composite center of gravity of the electric motor and mounting apparatus, and more particularly, to apparatus for mounting a capstan drive motor to permit angular displacement with only a single degree of freedom about the composite center of gravity.

2. Description of the Prior Art

Magnetic tape cartridges are commonly used by data storage in digital computer processing equipment. Magnetic tape cartridges of the type used in digital data applications include a tape capstan which is frictionally engaged with a motor capstan driven by an electric motor when the tape cartridge is inserted into a tape transport to impart motion to the magnetic tape within the cartridge. The electric motor is ordinarily mounted so that it pivots slightly when the motor capstan frictionally engages the tape capstan when a tape cartridge is inserted into the tape transport. The motor mounting system provides counterforce which maintains a predetermined pressure between the motor capstan and the tape capstan so that magnetic tape is drawn past recording heads or playback heads at a constant rate to ensure accurate data recording or playback. It is highly desirable that the above mentioned pivoting occurs about the composite center of gravity of the electric motor capstan, and motor mounting system so that constant capstan pressure is maintained regardless or orientation (i.e. vertical, horizontal, etc.) of the transport. It is also important that the above described pivoting occur about the composite center of gravity so that the capstan pressure will be uniform if the tape transport is subjected to acceleration, shock or vibration. These factors are especially important if the tape transport is utilized in equipment which is normally subjected to acceleration, vibration, shock, etc. It is noteworthy that tape transports are commonly used in portable electronic equipment which is subjected to such conditions.

It is therefore an object of the present invention to provide a capstan motor mounting system which provides more accurate and uniform motor capstan pressure and more constant tape capstan speed than capstan motor mounting systems of the prior art.

It is highly desirable that capstan motor mounting systems have the lowest possible mass so that the amount of mass to be pivoted about the composite center of gravity when magnetic tape cartridges are inserted into the tape transport is minimized. Prior tape transport systems cause some difficulty in inserting magnetic tape cartridges because of the high mass associated with the capstan motor mounting system; such mass, along with the mass of the capstan motor, must be suddenly displaced by the pressure of the tape capstan against the motor capstan. This causes difficulty in cartridge insertion, and increases stresses on the motor mounting parts, thereby decreasing system reliability. Further, high mass capstan motor mounting systems are much more likely to be seriously damaged if the unit is dropped or subjected to other types of shock.

It is therefore an object of the invention to provide a capstan motor mounting system which has substantially less mass than prior art capstan motor mounting systems.

The closest known prior art capstan motor mounting system is described in U.S. Pat. No. 4,085,906, issued Apr. 25, 1978 to Dahl et al. That capstan motor mounting system includes a mounting plate having a cylindrical aperture therein and means for attaching the mounting plate to the capstan motor. The plane of the mounting plate passes directly through the center of gravity to the capstan motor. The mounting plate includes three apertures located at three apexes of an imaginary triangle symmetrically positioned about the cylindrical opening in which the capstan motor is supported. Three shoulder bolts extend through the three apertures and are firmly affixed to a rigid support. Three bias springs disposed about the three shoulder bolts support the mounting plate, so that it can be tilted in one plane by pressure on the motor capstan, causing displacement of the capstan motor and mounting system about the center of gravity of the capstan motor. This system has a number of moving parts, and is subject to the difficulty that the shafts of the shoulder bolts may frictionally engage the interiors of the triangularly located apertures causing variations in motor capstan pressure and tending to cause angular displacement of the capstan motor about a point other than the composite center of gravity. This can cause inaccuracies in recording or play back.

It is therefore an object of the ivnention to provide a mounting system for a capstan driving motor, which mounting system produces a constant driven capstan speed regardless of the direction of acceleration or shock applied to a tape transport in which the motor and mounting system is installed.

It is another object of the invention to provide a motor capstan mounting system having less mass than those of the prior art.

Other patents, deemed less relevant than the above patent, uncovered in a novelty search directed to the present invention, include U.S. Pat. Nos. 1,679,990, 2,558,541, 2,565,733, 2,690,891, 3,432,082, 3,625,466, 3,836,100 and 4,008,841.

SUMMARY OF THE INVENTION

Briefly described, and in accordance with one embodiment thereof, the invention provides a mounting system for a motor having a capstan connected to a shaft of the motor, which mounting system permits angular displacement of the motor about a composite center of gravity. The angular diaplcement may be produced by a movement of a tape capstan against the motor capstan as a magnetic tape cartridge is inserted into a tape transport in which the mounting system and motor are installed. The composite center of gravity is the composite center of gravity of the motor, motor capstan, and mounting system. The mounting system includes a motor support to which the motor is attached and also includes first and second connecting members hingeably attached to opposed ends of the motor support. The first and second connecting members are also hingeably attached to a rigid support. The first and second connecting members are angularly oriented with respect to the motor support such that first and second planes defined by the hingeably attached portions of the first and second connecting members, respectively, intersect approximately at the composite center of gravity. At least one of the hingeable attachments is elastic, so that the motor resists angular displacement about the composite center of gravity, and produces a predetermined force to counter the force producing the angular displacement. In the described embodiment of the invention, the motor mounting means includes a rectangular sheet of stainless steel. The sheet is divided into five rectangular sections separated by four parallel bends in the sheet material. The opposite end sections each have opposed flanges formed by side portions bent 90° with respect to the sheet. The bent portions of the sheet constitute flexure lines which function as the hingeable attachments. The central section of the sheet constitutes the motor support, and has a central opening therein through which a cylindrical housing of the motor extends. The motor housing is clamped to the motor support by means of a lower clamping plate having a cylindrical opening through which the cylindrical housing extends and two upper clamping plates, each having cylindrical openings therein with opposed beveled edges. Two wire loops disposed between the upper clamping plates between the beveled edges are forced against each other and against the motor housing to rigidly engage the motor housing as the three clamping plates are tightened toward each other by means of clamping screws. The motor support section of the sheet is supported between first and second rectangular sections of the sheet which are adjacent to the motor support section of the sheet. These two sections form the first and second connecting members. The first and second sections of the sheet have opposed side flanges and are oriented approximately perpendicularly to the first and second sections to provide rigidity. Third and fourth sections of the sheet adjacent to the first and second sections, respectively, are rigidly attached to a support surface of the tape transport in which the motor and mounting system are installed. When the motor is angularly displaced, the flexure line portions of the sheet bend elastically, providing a predetermined counter-resistance to the displacing force.

BRIEF DESCRIPTION OF THE DRAWINGS

FIG. 1 is a side view of the flexure motor mount system of the present invention.

FIG. 2 is a partial top view of a tape transport incorporating the flexure motor mount system of FIG. 1.

FIG. 3 shows a section view of the motor clamping system for the motor mounting system taken along section lines 3—3 of FIG. 1.

FIG. 4 is a section view taken along section lines 4—4 of FIG. 1.

DESCRIPTION OF THE INVENTION

Referring now to the drawings, and particularly to FIG. 1, which shows a partial side view of the motor mounting system of the present invention, a tape capstan 7 contained in a magnetic tape cartridge is pressed against motor capstan 5 when the magnetic tape cartridge is inserted into a tape transport. Details of the tape transport and magnetic cartridge are omitted from FIG. 1. However, several of the basic details of the tape transport and magnetic tape cartridge are shown in FIG. 2.

Magnetic tape cartridge 8 can be implemented by a magnetic tape cartridge manufactured by 3M Coporation. Another suitable magnetic tape cartridge which is commerically available is described in U.S. Pat. No. 3,692,255.

Referring again to FIG. 1, motor capstan 5 is coaxially mounted on rotating shaft 4 of DC motor 3. Thus, when magnetic tape carrtidge 8 is laterally inserted into the tape transport, motor 3, shaft 4 and motor capstan 5 are tilted in one plane so that the axis of motor 3 rotates from the position indicated by reference numeral 47 to the position indicated by reference numeral 9.

The dotted line outline of motor capstan 5, shaft 4, and motor 3 indicate the "free" motor position before motor capstan 5 is contacted by tape capstan 7. The solid line outline of motor capstan 5, shaft 4, and motor 3 indicates the "operating" position thereof, with the magnetic cartridge fully inserted.

In the described embodiment of the invention, the angle between the axis position indicated by reference numerals 9 and 47 is approximately 2.3°.

Referring now to both FIG. 1 and FIG. 2, motor 3 is supported by a flexure mount system 1 including a single rectangular sheet of stainless steel formed as shown in the drawings and attached to the underside of tape transport surface 11. Flexure mount system 1 further includes a motor clamping system including lower clamping plate 25, two upper clamping plates 27 and 29 and two stainless steel wire loops 31 and 32.

Tape transport surface 11 has a circular hole 16 therein through which shaft 4 and motor capstan 5 extend. The rectangular sheet is divided into five rectangular sections, 17A, 22A, 23, 22B and 17B, separated by parallel bends (hereinafter referred to as flexure lines) 19A, 20A, 20B and 19B, respectively. Sections 17A and 17B are referred as as end sections, sections 22A and 22B are referred to as connecting sections, and section 23 is referred to as the motor support section. Motor support section 23 has a circular hole 37 therein which is slightly greater than the diameter of the housing of motor 3.

End sections 17A and 17B have perpendicular opposed flanges designated by reference numerals 36A and 36B, respectively. The flanges 36A and 36B are formed by bending corresponding tabs of the stainless steel rectangular sheet. Similarly, connecting sections 22A and 22B have opposed perpendicualr flanges designated by reference numerals 35A and 35B, respectively. Motor support section 23 has opposed perpendicular flanges designated by reference numeral 25A. The foregoing flanges greatly increase the stiffness of end sections 17A and 17B, connecting sections 22A and 22B, and motor support section 23.

End section 17A has two holes 15A and 15A' therein. A thick metal clamping plate 14A has corresponding holes aligned with holes 18A and 18A'. A bolt 115A extending through hole 184 is utilized to bolt clamping plate 14A and end section 17A against the under surface of tape transport surface plate 11 by threading bolt 115A into a threaded hole in tape transport surface plate 11. Bolt 115A' extends through hole 18A' to clamp clamping plate 14A and end section 17A to the under surface of tape transport surface plate 11.

Similarly, plate 14B, bolts 115B and 115B' extend through holes 18B and 18B', respectively, of end section 17B to rigidly attach the opposite end of the stainless steel sheet to the portion of tape transport surface plate 11 on the opposite side of opening 16.

The above mentioned stainless steel sheet is pre-bent along flexure lines 19A, 19B, 20A, and 20B to provide a predetermined amount of resistance of angular displacement of an axis of motor 3 in a plane perpendicular to the flexure lines.

Motor support section 23 of the stainless steel sheet is maintained rigid by means of clamping plates 25, 27 and 29, each of which has a rectangular perimeter approximately coextensive with the perimeter of motor support section 23 and a central circular aperture therein approximately coextensive with circular hole 37 in motor support section 23. Clamping plates 25, 27 and 29 are bolted together by means of screws 41A, 41B, 42A and 42B through aligned holes (not shown) of each plate. The four aligned holes of the clamping plates are aligned with corresponding holes in motor support section 23.

The circular holes in clamping plates 27 and 29 have opposed beveled edges, as indicated in FIG. 3 by reference numerals 29A and 27A, respectively. Two stainless steel wire loops 31 and 32 having circular cross-sections are disposed in the V-shaped groove formed or bounded by opposed beveled edges 29A and 27A. Thus, as screws 41A, 41B, 42A and 42B tighten clamping plate 25 (which is positioned below motor support section 23) and clamping plates 27 and 29 (which are disposed above motor support section 25 in that order), as shown in FIGS. 2 and 3, wire loops 31 and 32 are pressed inwardly and against each other to tightly engage the cylindrical housing of motor 3 and beveled edges 27A and 29A, thereby tightly attaching motor 3 to motor support section 25 of the stainless steel flexure sheet.

The degree of bending along flexure lines 19A, 19B, 20A and 20B is such that plane 26A of connecting section 22A and plane 46B of connecting section 22B intersect approximately at the composite center of gravity, designated by reference numeral 46, of motor 3, shaft 4, motor capstan 5 and motor mount assembly 1. For small angular displacement of the axis of motor 3, the entire motor 3, shaft 4, and motor capstan 5 rotate approximately about composite center of gravity 45.

A partial view of an inserted magnetic cartridge 8, showing tape capstan 7 frictionally engaging motor capstan 5 and also showing magnetic tape 51 passing across the playback/recording head surface of read/write record head 53 are shown in FIG. 2. Further details of tape transports are shown in U.S. Pat. No. 4,085,906, by Dahl et al., issued Apr. 25, 1978 and incorporated herein by reference to show details known in the prior art.

In the described embodiment of the invention, 8 mil thick stainless steel sheet material designated by manufacturers as 302 stainless steel is utilized. In the "operation position", which is the position indicated by the solid lines in FIG. 1, the force applied to motor capstan 5 by tape capstan 7 is approximately 1.6 lbs. (however, various other stiff but elastic materials can be utilized). The described mounting system is torsionally quite stiff, and produces approximately 1.6 lbs. of counterforce against tape capstan 7 in response to a linear displacement of motor capstan 5 of only approximately 0.08 inches. The high degree of torsional stiffness of the above described flexure mount system produces a very short composite mechanical time constant for the motor, shaft and motor capstan. This results in very uniform pressure between motor capstan 5 and tape capstan 7 even though motor capstan 5 may be slightly unround. The system shown in FIGS. 1 and 2 is effectively suspended about its center of gravity 45 so that shock, vibration, acceleration and deceleration have negligible effect on pressure between tape capstan 7 and motor capstan 5. Consequently, highly accurate, uniform tape speed and correspondingly highly accurate information recording and playback can be achieved.

It can be seen that the angles of connecting sections 22A and 22B can be readily selected to intersect at the composite center of gravity for any motor mounting position, thus providing almost limitless design freedom. Because of this design freedom, the motor housing can be attached to motor support section 23 at points located at considerable distance away from the composite center of gravity, resulting in a more compact and lightweight assembly than can be achieved by prior systems for mounting a motor about a composite center of gravity.

It is noteworthy that the amount of bending along the flexure lines can be selected to provide a calibrated amount of loading of the motor capstan against the tape drive capstan in the operating position. This degree of preload is adjustable during the manufacturing operation to provide a broad range of contact forces between the motor capstan and the tape drive capstan.

An advantage of the described flexure motor mount system is that it is extremely durable compared to previous systems which utilize pivot pins to mount a motor about its center of gravity. Such prior mounting systems are frequently damaged by shocks which occur if a unit is bumped or dropped. Further, the described motor monting system has no moving parts and requires no lubrication or other maintenance. Due to its simplicity, it is intially far less expensive than prior mounting systems for capstan drive motors. If additional weight (for example a heat sink) must be attached to the motor, the angles of the bends in the rectangular sheet at the flexure lines can be inexpensively modified so that planes 46A and 46B intersect at a modified composite center of gravity; substantially more expensive modifications would be required to accomplish the same result for known motor mounting systems.

Although the invention has been described herein with reference to a particular embodiment thereof, those skilled in the art will recognize that variations in arrangement and placement of parts may be made without departing from the true spirit and scope of the invention. For example, an elastic "0-ring" could be utilized between clamping plates 27 and 29 in place of wire loops 31 and 32; similarly, a flat rubber washer would be utilized between clamping plates 27 and 29. Such O-ring or flat washer would then be squeezed inwardly to grip housing of motor 3 when the clamping plates are tightened together by means of the clamping screws. It is not mandatory that the flexure mount be formed from a single metal sheet. Individual connecting members may be hinged together by conventional hinges. Torsional stiffness may be provided by various springing arrangements, whereby planes defined by the connecting members intersect approximately at the composite center of gravity. Therefore, the scope of the invention is to be limited only as set forth in the following claims.

I claim:

1. In an apparatus including a rigid support and a motor having a rotatable shaft, a first roller connected to said shaft, and a second roller controllably movable to frictionally engage said first roller to cause said second roller to be rotated, said shaft having a first axis, a motor mounting system comprising in combination:

a. support means for supporting said motor, said support means having first and second opposed ends thereof;

b. a first connecting member for supporting said first end of said support means, said first connecting member having a first end hingeably connected to said first end of said support means and a second end hingeably connected to said rigid support;

c. first end means for hingeably connecting the first and second ends of said first connecting member to said rigid support and said support means, respectively;

d. a second connecting member for supporting said second end of said support means, said second connecting member having a first end hingeably connected to said second end of said support means and a second end hingeably connected to said rigid support;

e. second end means for hingeably connecting the first and second ends of said second connecting member to said rigid support and said support means, respectively; and f. attaching means for attaching said motor to said support apparatus, a first plane passing through said hingeably connected ends of said first connecting member intersecting a second plane passing through said hingeably connected ends of said second connecting member in a line passing through a point located approximately at the composite center of gravity of said motor mounting system and said motor.

2. The motor mounting system of claim 1 wherein said apparatus includes a tape transport for a magnetic tape cartridge.

3. The motor mounting system of claim 1 wherein said first and second end means include, respectively, first elastic means for elastically hingeably connecting said first connecting member to said first end means and said support means and second elastic means for elastically hingeably connecting said second connecting member to said second end means and said support means.

4. The motor mounting system of claim 3 wherein said support means, said first and second connecting members, and said first and second end means are contained, respectively, in a plurality of sections of a sheet of elastic material, said sections being divided by a plurality of parallel flexure lines, said sheet of elastic material being bent by predetermined amounts along each of said flexure lines, respectively.

5. The motor mounting system of claim 4 wherein said elastic means includes material of said sheet of elastic material at said flexure lines.

6. The motor mounting system of claim 5 wherein said sections of said sheet containing said first and second end means and said first and second connecting means each include two opposed side flanges for stiffening said sections containing said first and second end means and said first and second connecting means.

7. The motor mounting system of claim 4 wherein said motor has a housing, and wherein said section containing said support means has an opening therein for receiving said housing, said attaching means including a first clamping plate having an opening therein for receiving said housing disposed along one surface of said section containing said support means, a second clamping plate having an opening therein for receiving said housing disposed on an opposite surface of said section containing said support means, and a third clamping plate having an opening for receiving said housing disposed adjacent said second clamping plate, said attaching means further including pressure means disposed between said second and third clamping plates for being forced against said housing when said first, second and third clamping plates are tightened together, said attaching means further including means for tightening said first, second and third clamping plates together.

8. The motor mounting system of claim 7 wherein said second and third clamping plates have opposed beveled surfaces, respectively, wherein said pressure means includes a first wire ring having an approximately circular cross-section wedged between said beveled surfaces, whereby said first wear ring is forced against said housing by said opposed beveled surfaces when said first, second, and third clamping plates are tightened together.

9. The motor mounting system of claim 8 further including a second wire ring wedged between said opposed beveled surfaces adjacent said first wire ring.

10. The motor mounting system of claim 4 wherein said sheet of elastic material is composed of stainless steel.

* * * * *